J. W. McCLURE.
Churn.
No. 167,774.　　　　　　　　　　　Patented Sept. 14, 1875.
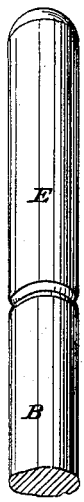
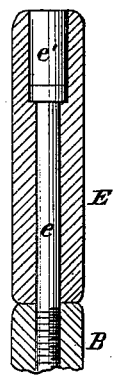
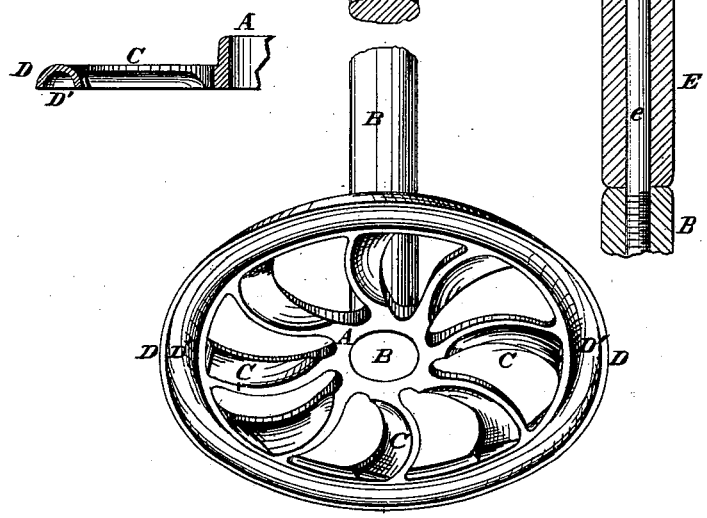
ATTEST:
Robt Burns,
Chas. J. Gooch
INVENTOR:
Jacob W. McClure
By Knight Bro.

UNITED STATES PATENT OFFICE.

JACOB W. McCLURE, OF ST. LOUIS, MISSOURI, ASSIGNOR OF ONE-HALF HIS RIGHT TO WILLIAM H. GARRETT, OF SAME PLACE.

IMPROVEMENT IN CHURNS.

Specification forming part of Letters Patent No. 167,774, dated September 14, 1875; application filed August 7, 1875.

*To all whom it may concern:*

Be it known that I, JACOB W. MCCLURE, of St. Louis, St. Louis county, State of Missouri, have invented a certain Improved Churn-Dasher, of which the following is a specification:

This invention consists, first, in a churn-dasher, having a central hub united to an outer rim by a series of inclined spokes or vanes, the outer rim being hollowed out on its under surface to form a chamber for the purpose of carrying air down into the cream; second, in securing to the top of the dasher-stem a rotatable handle by a suitable bolt, so that the dasher is free to rotate, while the handle is held by the operator, and this arrangement allows the operator to keep the dasher from rotating by simply grasping the dasher-staff below the handle.

Figure 1 is an under perspective view of the dasher. Fig. 2 is a detail section of the dasher. Fig. 3 is a detail section of the handle.

The dasher consists of a central hub, A, in which the dasher-staff B is secured, and having a number of radial vanes or spokes, C, which unite the hub to an outer rim, D. This rim D is formed with an annular recess, D', in its under side, for the purpose of carrying air down through the cream in churning.

The vanes or spokes C are inclined from a horizontal circumferential line, so that, in churning, when the operator grasps the staff below the rotating handle, and as the dasher is moved up or down the inclined arms cause the cream to revolve. On the top of the dasher-staff B the handle E is secured by a bolt, e, which passes down axially through the handle, and screws into the top of the dasher-staff B, the head of the bolt being covered by a plug, e', in the handle, as shown. This construction allows the dasher to freely rotate when the handle is held by the operator.

In use the dasher will have a vertical reciprocating movement imparted to it by the operator, and as the dasher is moved downward the cream is caused to revolve in one direction, and the ascension of the dasher causes an opposite revolution to the cream. This combined vertical and rotatory movement acts to accomplish the churning rapidly. In gathering the butter the dasher is allowed to rotate by the operator catching hold of the handle E.

I claim as my invention—

1. The churn-dasher formed of hub A, inclined radial spokes or vanes C, and rim D, having annular recess D', as and for the purpose set forth.

2. The combination of the propeller dasher C D, firmly attached to staff B, and short-turning hand sleeve or handle E, substantially as and for the purpose set forth.

3. The combination of the rotatory dasher A C D and staff B, with handle E, and bolt e, as and for the purpose set forth.

JACOB W. McCLURE.

Witnesses:
SAML. KNIGHT,
HAROLD HUTCHINS.